(12) United States Patent
Carr et al.

(10) Patent No.: US 10,915,943 B2
(45) Date of Patent: Feb. 9, 2021

(54) ORDER PROCESSING SYSTEMS AND METHODS

(71) Applicant: WAL-MART STORES, INC., Bentonville, AR (US)

(72) Inventors: David Jon Carr, Mountain View, CA (US); Richard Mark Ramsden, Foster City, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 299 days.

(21) Appl. No.: 15/881,782

(22) Filed: Jan. 28, 2018

(65) Prior Publication Data
US 2018/0150901 A1   May 31, 2018

Related U.S. Application Data

(62) Division of application No. 14/529,908, filed on Oct. 31, 2014, now Pat. No. 10,657,578.

(51) Int. Cl.
*G06Q 30/06* (2012.01)

(52) U.S. Cl.
CPC ..... *G06Q 30/0635* (2013.01); *G06Q 30/0603* (2013.01); *G06Q 30/0605* (2013.01);
(Continued)

(58) Field of Classification Search
CPC ......... G06Q 30/00–08; G06Q 30/0635; G06Q 30/0603; G06Q 30/0605
See application file for complete search history.

(56) References Cited

U.S. PATENT DOCUMENTS

| 5,235,509 A | 8/1993 | Mueller et al. |
| 6,876,977 B1 | 4/2005 | Marks |

(Continued)

OTHER PUBLICATIONS

The New Chinese Takeout: Panda Express Debuts Online Ordering Experience. Business Wire; New York [New York]Sep. 10, 2014. Retrieved via ProQuest. (Year: 2014).*

(Continued)

*Primary Examiner* — Michael Misiaszek
(74) *Attorney, Agent, or Firm* — Bryan Cave Leighton Paisner LLP

(57) ABSTRACT

A system identifying an order comprising items for users for delivery to a common geographic location by: identifying an order comprising items for users for delivery to a common geographic location, wherein the order further comprises instructions to separate each item of the items associated with each one of the users by: receiving an indication to identify the each item of the items in the order, wherein the order is stored in a database of a retailer; receiving an indication to identify the users associated with the order by accessing user accounts for the each one of the users, wherein the user accounts are stored in a user database; receiving an indication to identify a particular user of the users that is associated with the each item of the items in the order; and generating a list of items of the items associated with the each one of the users; calculating respective payments for respective portions of the order, wherein the each one of the users is presented with a respective one of the lists of items and a respective cost for the respective one of the lists of items associated with the respective portions of the order; receiving the respective payments associated with the respective portions of the order from the each one of the users, the respective payments being applied to the respective one of the lists of items; and generating order processing instructions to process the respective one of the lists of items (Continued)

associated with the each one of the users after receiving respective ones of the respective payments from respective ones of the each one of the users. Other embodiments are disclosed herein.

20 Claims, 7 Drawing Sheets

(52) U.S. Cl.
CPC ......... *G06Q 30/06* (2013.01); *G06Q 30/0601* (2013.01); *G06Q 30/0633* (2013.01)

(56) References Cited

U.S. PATENT DOCUMENTS

| | | | |
|---|---|---|---|
| 7,124,107 | B1 | 10/2006 | Pishevar et al. |
| 7,970,661 | B1 | 6/2011 | Abraham et al. |
| 8,498,934 | B2 | 7/2013 | Todd |
| 2002/0143655 | A1* | 10/2002 | Elston ............... G06Q 20/02 705/26.81 |
| 2005/0177446 | A1 | 8/2005 | Hoblit |
| 2010/0030578 | A1 | 2/2010 | Siddique et al. |
| 2011/0184834 | A1 | 7/2011 | Perrochon et al. |
| 2012/0036028 | A1* | 2/2012 | Webb ............... G06Q 30/06 705/15 |
| 2012/0185355 | A1 | 7/2012 | Kilroy |
| 2012/0246066 | A1 | 9/2012 | Rice et al. |
| 2013/0041824 | A1 | 2/2013 | Gupta |
| 2013/0054328 | A1 | 2/2013 | Chavie et al. |
| 2013/0151357 | A1* | 6/2013 | Havas ............... G06Q 50/12 705/15 |
| 2013/0268331 | A1 | 10/2013 | Bitz et al. |
| 2014/0108178 | A1 | 4/2014 | Cao |
| 2014/0195042 | A1 | 7/2014 | Adler |
| 2016/0335624 | A1 | 11/2016 | Naaman |

OTHER PUBLICATIONS

MealAgent Launches National Free Online Food Ordering Website PR Newswire; New York [New York]Jun. 21, 2006: n/a. Retrieved via ProQuest (Year: 2000).*

* cited by examiner

ORDER PROCESSING SYSTEMS AND METHODS

CROSS-REFERENCE TO RELATED APPLICATIONS

This application is a divisional of U.S. patent application Ser. No. 14/529,908, filed Oct. 31, 2014, which is incorporated herein by reference in its entirety.

TECHNICAL FIELD

The present disclosure relates to order processing systems and methods that support separating a single order into multiple portions associated with multiple customers.

BACKGROUND

Many customers purchase items online and have the items delivered to their home instead of going to shop for the items at a physical store. In some situations, multiple people who share a household (e.g., roommates in an apartment, house or other living quarters) may want to order items from the same online merchant. In these situations, each person may place a separate order with the online merchant and schedule their own delivery time. This approach results in multiple deliveries to the same address, which is likely to increase delivery costs to the online merchant, and may increase the total delivery fees charged to the multiple people. Alternatively, the multiple people may place a single order, which is delivered at one time. This approach requires someone in the household to separate the items upon delivery. Also, one member of the household must pay for the order, then determine the item costs allocated to each person and collect those costs from the other people. These current approaches are inefficient, costly, and tedious to manage.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

DESCRIPTION OF EXAMPLES OF EMBODIMENTS

Figure 1:
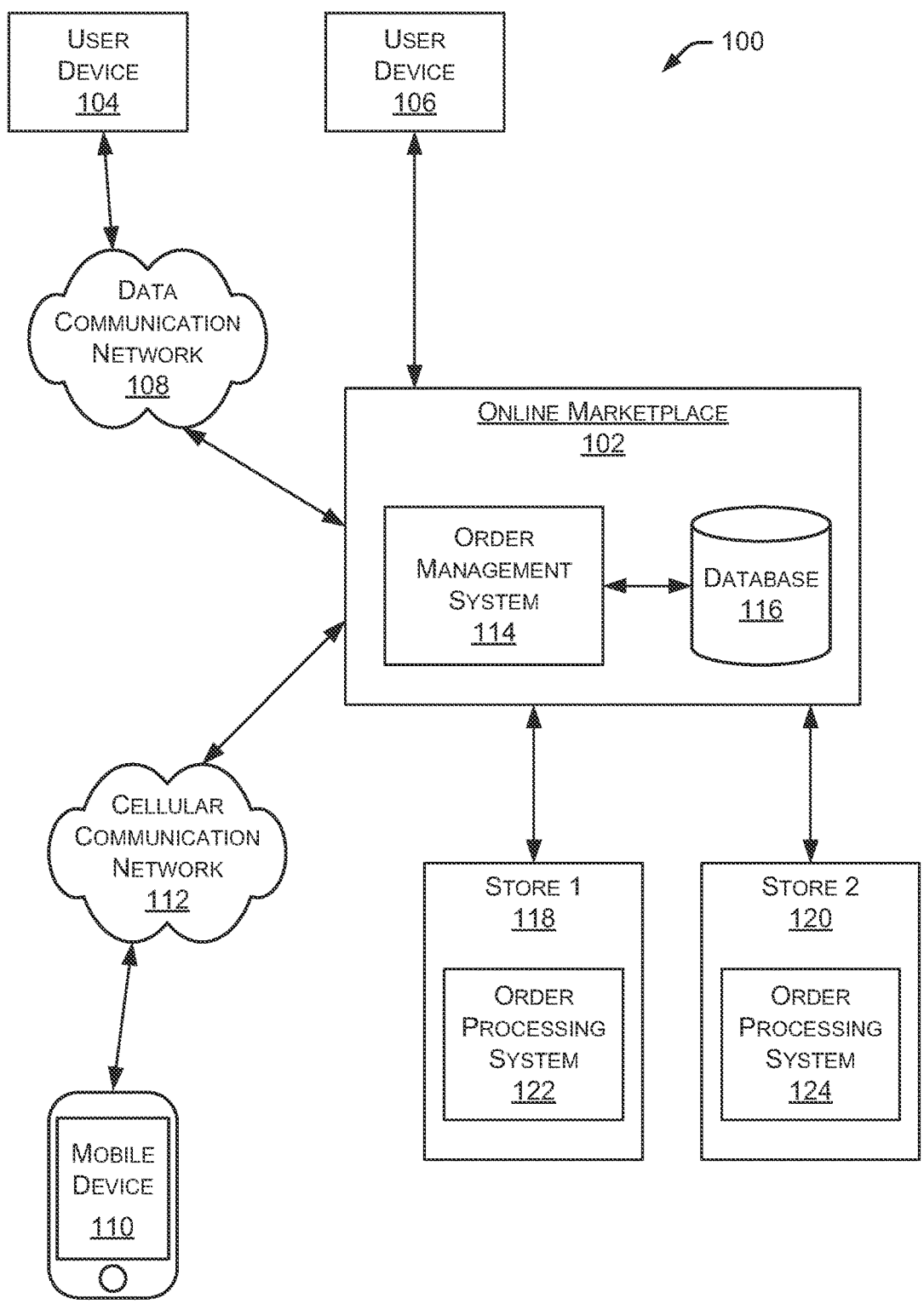
FIG. 1 is a block diagram depicting an environment within which an example embodiment may be implemented.

In an embodiment, a system comprises: one or more processing modules; and one or more non-transitory memory storage modules storing computing instructions configured to run on the one or more processing modules and perform: identifying an order comprising items for users for delivery to a common geographic location, wherein the order further comprises instructions to separate each item of the items associated with each one of the users by: receiving an indication to identify the each item of the items in the order, wherein the order is stored in a database of a retailer; receiving an indication to identify the users associated with the order by accessing user accounts for the each one of the users, wherein the user accounts are stored in a user database; receiving an indication to identify a particular user of the users that is associated with the each item of the items in the order; and generating a list of items of the items associated with the each one of the users; calculating respective payments for respective portions of the order, wherein the each one of the users is presented with a respective one of the lists of items and a respective cost for the respective one of the lists of items associated with the respective portions of the order; receiving the respective payments associated with the respective portions of the order from the each one of the users, the respective payments being applied to the respective one of the lists of items; and generating order processing instructions to process the respective one of the lists of items associated with the each one of the users after receiving respective ones of the respective payments from respective ones of the each one of the users.

In an embodiment, a method comprises: identifying, with a computer system using one or more processors, an order comprising items for users for delivery to a common geographic location, wherein the order further comprises instructions to separate each item of the items associated with each one of the users by: receiving, with the computer system, an indication to identify the each item of the items in the order, wherein the order is stored in a database of a retailer; receiving, with the computer system, an indication to identify the users associated with the order by accessing user accounts for the each one of the users, wherein the user accounts are stored in a user database; receiving, with the computer system, an indication to identify a particular user of the users that is associated with the each item of the items in the order; and generating, with the computer system, a list of items of the items associated with the each one of the users; calculating, with the computer system, respective payments for respective portions of the order, wherein the each one of the users is presented with a respective one of the list of items and a respective cost for the respective one of the lists of items associated with the respective portions of the order; receiving, with the computer system, the respective payments associated with the respective portions of the order from the each one of the users, the respective payments being applied to the respective one of the list of items; and generating, with the computer system, order processing instructions to process the respective one of the lists of items associated with the each one of the users after receiving respective ones of the respective payments from respective ones of the each one of the users.

The systems and methods described herein allow multiple people to place a single order for delivery to a common household. When selecting multiple items for the order, a person is associated with each item selected. When the order is finalized, each person pays for their portion of the order, as determined by the items associated with that person. When the merchant prepares the order for delivery to the common household, each person's items are placed in separate containers (e.g., separate bags or separate boxes), which simplifies separation of the items at the household.

The described systems and methods provide an improved user experience by allowing each person to pay for their own portion of the items purchased, and the items are packed for delivery such that each user receives their own container with the items they purchased. These systems and methods allow the merchant to make a single delivery to a household for multiple people instead of scheduling separate delivery times for each individual person ordering items.

In the following description, reference is made to the accompanying drawings that form a part thereof, and in which is shown by way of illustration specific exemplary embodiments in which the disclosure may be practiced. These embodiments are described in sufficient detail to enable those skilled in the art to practice the concepts disclosed herein, and it is to be understood that modifications to the various disclosed embodiments may be made, and other embodiments may be utilized, without departing from the scope of the present disclosure. The following detailed description is, therefore, not to be taken in a limiting sense.

Reference throughout this specification to "one embodiment," "an embodiment," "one example," or "an example" means that a particular feature, structure, or characteristic described in connection with the embodiment or example is included in at least one embodiment of the present disclosure. Thus, appearances of the phrases "in one embodiment," "in an embodiment," "one example," or "an example" in various places throughout this specification are not necessarily all referring to the same embodiment or example. Furthermore, the particular features, structures, databases, or characteristics may be combined in any suitable combinations and/or sub-combinations in one or more embodiments or examples. In addition, it should be appreciated that the figures provided herewith are for explanation purposes to persons ordinarily skilled in the art and that the drawings are not necessarily drawn to scale.

Embodiments in accordance with the present disclosure may be embodied as an apparatus, method, or computer program product. Accordingly, the present disclosure may take the form of an entirely hardware-comprised embodiment, an entirely software-comprised embodiment (including firmware, resident software, micro-code, etc.), or an embodiment combining software and hardware aspects that may all generally be referred to herein as a "circuit," "module," or "system." Furthermore, embodiments of the present disclosure may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present disclosure may be written in any combination of one or more programming languages. Such code may be compiled from source code to computer-readable assembly language or machine code suitable for the device or computer on which the code will be executed.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction and then scaled accordingly. A cloud model can be composed of various characteristics (e.g., on-demand self-service, broad network access, resource pooling, rapid elasticity, and measured service), service models (e.g., Software as a Service ("SaaS"), Platform as a Service ("PaaS"), and Infrastructure as a Service ("IaaS")), and deployment models (e.g., private cloud, community cloud, public cloud, and hybrid cloud).

The flow diagrams and block diagrams in the attached figures illustrate the architecture, functionality, and operation of possible implementations of systems, methods, and computer program products according to various embodiments of the present disclosure. In this regard, each block in the flow diagrams or block diagrams may represent a module, segment, or portion of code, which comprises one or more executable instructions for implementing the specified logical function(s). It will also be noted that each block of the block diagrams and/or flow diagrams, and combinations of blocks in the block diagrams and/or flow diagrams, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flow diagram and/or block diagram block or blocks.

FIG. 1 is a block diagram depicting an environment 100 within which an example embodiment may be implemented. Environment 100 includes an online marketplace 102 coupled to user devices 104 and 106. In this example, online marketplace 102 is coupled directly to user device 106, and coupled to user device 104 through a data communication network 108, such as the Internet. Additionally, online marketplace 102 is coupled to a mobile device 110 through a cellular communication network 112. Although two user devices 104, 106 and one mobile device 110 are shown in FIG. 1, alternate embodiments may include any number of user devices 104, 106 and mobile devices 110 coupled to online marketplace 102. User devices 104, 106 and mobile device 110 include any type of device capable of communicating with online marketplace 102 through data communication network 108 or cellular communication network 114, such as a cellular phone, a smart phone, a tablet computer, a laptop computer, a desktop computer, a portable entertainment device, a portable gaming device, a gaming console, a set top box, and the like.

Online marketplace 102 includes any type of website or online service that is accessible by one or more users to purchase any type of product or service. Online marketplace 102 may be implemented using one or more systems and/or services, such as web servers, application servers, and the like. A particular online marketplace 102 may offer products or services associated with a single entity (e.g., a single merchant) or from multiple different entities. In some embodiments, online marketplace 102 is implemented by the entity (e.g., merchant) offering the products or services. In other embodiments, online marketplace 102 is implemented by a third party for the benefit of the merchant. Online marketplace 102 may also be referred to as an "ecommerce site," a "mobile commerce site," an "ecommerce marketplace," or an "online ecommerce marketplace." As discussed herein, online marketplace 102 includes an order management system 114 and a database 116, which stores, for example, information associated with the products and services available through online marketplace 102. Database 116 may also store customer data, order data, item availability data, payment data, delivery data, physical store data, and the like. In some embodiments, database 116 stores data utilized by one or more servers to implement online marketplace 102.

Online marketplace 102 communicates with various systems, services, and devices through data communication network 108. Data communication network 108 may utilize any communication protocol and any type of communication medium. In some embodiments, data communication network 108 is a combination of two or more networks coupled to one another. Online marketplace 102 also communicates with various systems and devices, such as mobile devices, through cellular communication network 112, which may utilize any communication protocol and any type of communication medium. In some embodiments, cellular communication network 112 is a combination of two or more networks coupled to one another.

Online marketplace 102 is also coupled to physical stores 118 and 120. In some embodiments, physical stores 118 and 120 are associated with the same merchant associated with online marketplace 102, and located in different geographic locations. Physical stores 118 and 120 may also be referred to as "brick and mortar" stores. Physical store 118 includes an order processing system 122 and physical store 120 includes an order processing system 124. As discussed herein, order processing systems 122 and 124 interact with order management system 114, and other components and systems within online marketplace 102, to support identification, fulfillment, and delivery of items in an order to a user (e.g., a customer of online marketplace 102). In some embodiments, order management system 114 communicates orders to a specific physical store based on the user's geographic proximity to the physical store. In other embodiments, the user selects a particular physical store to deliver the order. Although two physical stores 118, 120 are shown in FIG. 1, alternate embodiments may include any number of physical stores (and corresponding order processing systems) coupled to online marketplace 102.

Figure 2:
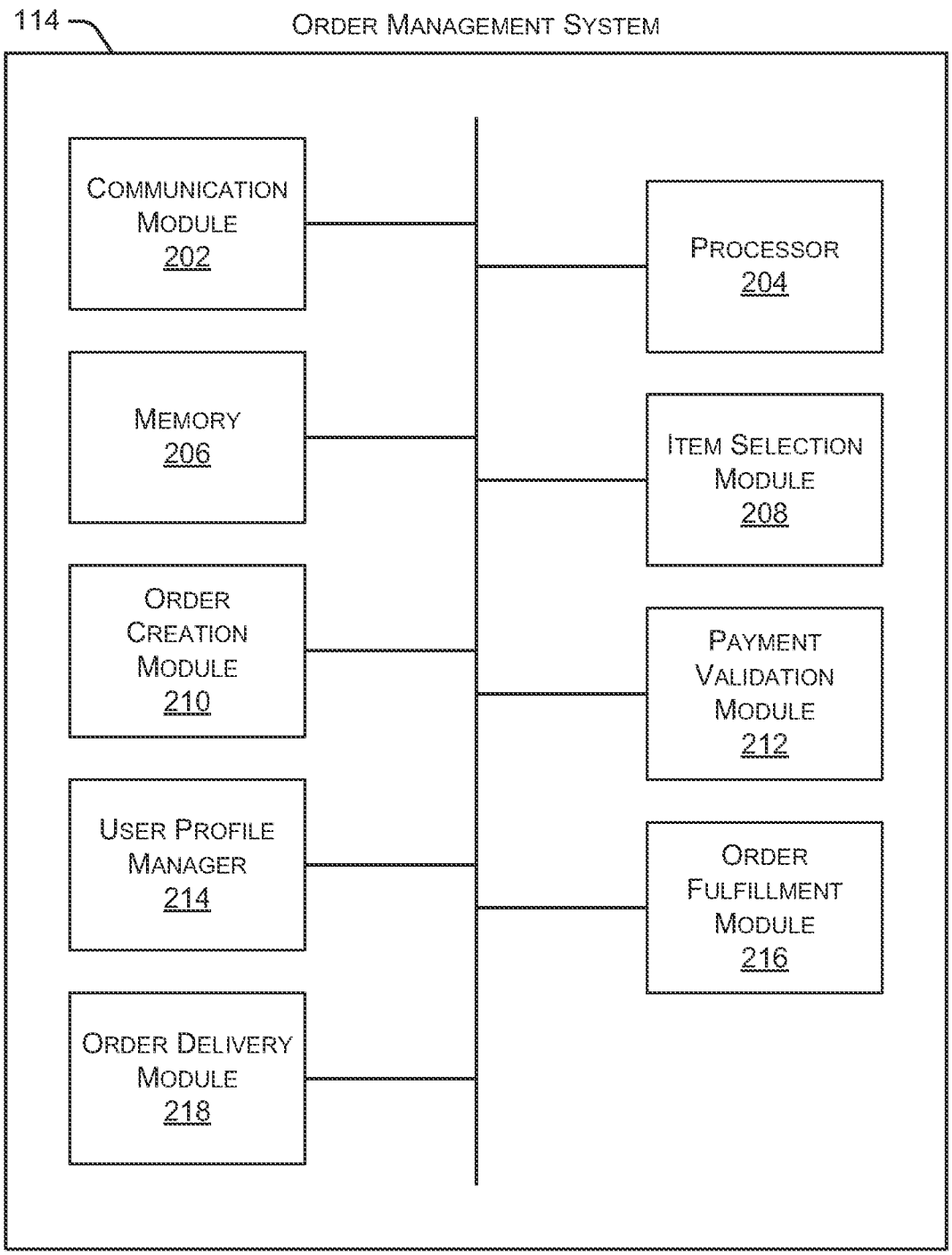
FIG. 2 is a block diagram depicting an embodiment of an order management system.

FIG. 2 is a block diagram depicting an embodiment of order management system 114. Order management system 114 performs various functions related to the operation of online marketplace 102, as discussed herein. Order management system 114 includes a communication module 202, a processor 204, and a memory 206. Communication module 202 allows order management system 114 to communicate with other systems, such as communication networks, other servers, user devices 104, 106, mobile device 110, physical stores 118, 120, order processing systems 122, 124, and the like. Processor 204 executes various instructions to implement the functionality provided by order management system 114. Memory 206 stores these instructions as well as other data used by processor 204 and other modules contained in order management system 114.

Order management system 114 also includes an item selection module 208, which allows users to select one or more items to purchase through online marketplace 102. As discussed herein, item selection module 208 may also allow users to identify a person associated with each selected item (e.g., the person to which the selected item is to be delivered). Order management system 114 further includes an order creation module 210, which handles the receiving and creation of orders placed by one or more users. In some embodiments, order creation module 210 manages online shopping carts, order checkout processes, shipping policies, and the like. A payment validation module 212 performs various functions associated with the validation of user payments. As discussed herein, a particular order may have items associated with multiple users. In this situation, each user may pay for their portion of the order separately, using different payment methods (e.g., credit card, debit card, gift card, electronic funds transfer, electronic check, and the like). Thus, payment validation module 212 can perform the processing and validation of multiple payment methods for a single order.

Order management system 114 further includes a user profile manager 214, which maintains various information about users of online marketplace 102. For example, user profile manager 214 may store information regarding user names, user accounts, user purchase history, user delivery address, user payment methods, and the like. An order fulfillment module 216 generates instructions for fulfilling an order (e.g., picking and packaging items contained in the order). In some embodiments, the order fulfillment instructions are communicated to the specific physical store that will fulfill and deliver the order to the user (or users). As discussed herein, the order fulfillment instructions may include directions to package items for each user separately (e.g., in separate bags or separate containers). An order delivery module 218 generates instructions for delivering an order, such as delivery address, driving directions, delivery time (or delivery time window), and the like.

Figure 3:
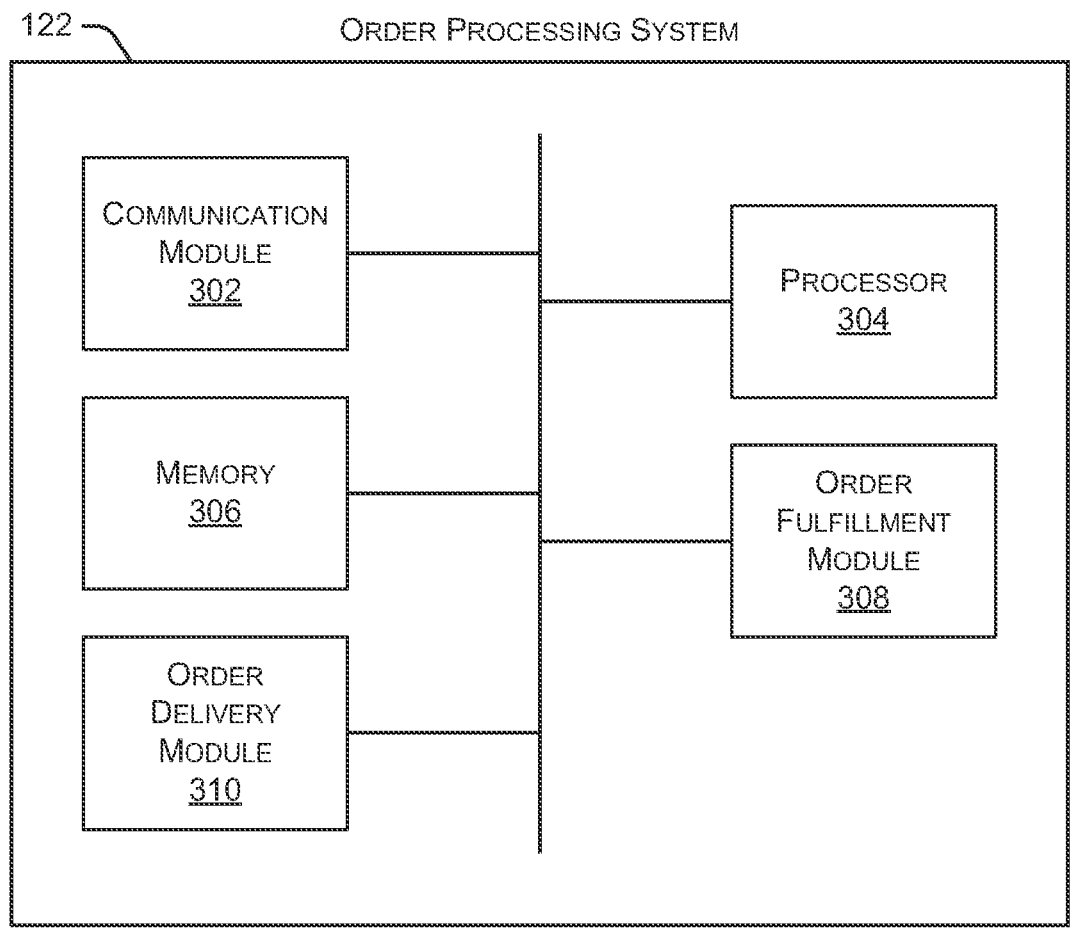
FIG. 3 is a block diagram depicting an embodiment of an order processing system.

FIG. 3 is a block diagram depicting an embodiment of order processing system 122. Order processing system 124 associated with physical store 120 may contain similar components and systems as order processing system 122 discussed below. Order processing system 122 performs various functions at a physical store that will fulfill and deliver specific orders, as discussed herein. Order processing system 122 includes a communication module 302, a processor 304, and a memory 306. Communication module 302 allows order processing system 122 to communicate with other systems, such as communication networks, other servers, order management system 114, and the like. Processor 304 executes various instructions to implement the functionality provided by order processing system 122. Memory 306 stores these instructions as well as other data used by processor 304 and other modules contained in order processing system 122.

Order processing system 122 also includes an order fulfillment module 308 that generates instructions for fulfilling an order (e.g., picking and packaging items contained in the order). In some embodiments, the order fulfillment instructions are received from order management system 114. As discussed herein, the order fulfillment instructions may include directions to package items for each user separately (e.g., in separate bags or separate containers). Additionally, the order fulfillment instructions may include identification of where to find the item in a particular physical store or warehouse. An order delivery module 310 generates instructions for delivering an order, such as delivery address, driving directions, delivery time (or delivery time window), and the like.

As discussed above, order management system 114 includes order fulfillment module 216 and order delivery module 218. Additionally, order processing system 122 includes order fulfillment module 308 and order delivery module 310. In some embodiments, fulfillment modules 216 and 308 share the order fulfillment tasks, such as generation of the order fulfillment instructions. For example, order fulfillment module 216 may generate the order fulfillment instructions and communicate those instructions to order fulfillment module 308, which adds picking and packaging instructions based on the layout of the particular physical store. Similarly, in some embodiments, order delivery module 218 and order delivery module 310 may share the order delivery tasks. For example, order delivery module 218 may identify a delivery location and delivery time window, while order delivery module 310 adds delivery instructions, delivery personnel, and other details based on the location of the physical store and the delivery location of the user (or users).

Figure 4:
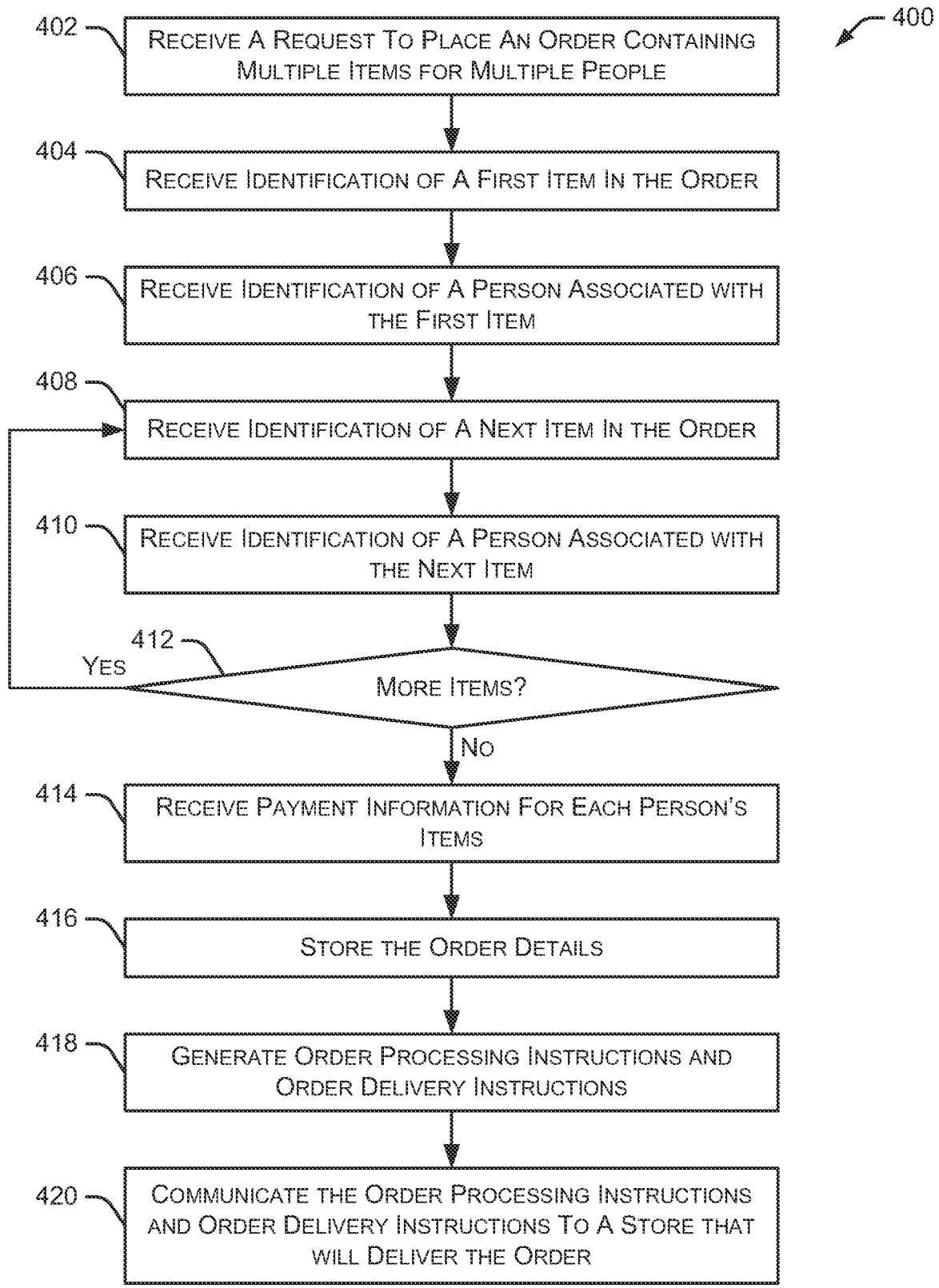
FIG. 4 is a flow diagram depicting an embodiment of a method for generating an order containing multiple items for multiple people.

FIG. 4 is a flow diagram depicting an embodiment of a method 400 for generating an order containing multiple items for multiple people. In some embodiments, method 400 is performed by order management system 114. In other embodiments, method 400 is partially performed by order management system 114 and partially performed by order processing system 122 or 124. Initially, a request is received at 402 to place an order containing multiple items for multiple people. Method 400 also receives identification of a first item in the order at 404 and receives identification of a person associated with the first item at 406. As used herein, a "person" may also be referred to as a "customer" or a "user." In some embodiments, the order is an "online order" placed by one or more users through a merchant website or other order processing system. In alternate embodiments, the order may be placed in any manner and is not limited to online orders.

Method 400 continues by receiving identification of a next item in the order at 408 and receiving indication of a person associated with the next item at 410. A determination is made regarding whether more items need to be added to the order at 412. For example, if a person clicks an "add more items" button, the system will return to 408 to receive identification of the next item. Alternatively, method 400 may issue a query asking whether additional items are desired.

After all items have been identified, method 400 receives payment information for each person's items at 414. For example, a list of items for each person may be presented along with a cost of the items for each person. Each person then provides payment information for their portion of the order. In some embodiments, method 400 also receives address information (e.g., a delivery address for the order) along with the payment information. Alternatively, the address information may be retrieved from user profile data or other stored data. The order details (e.g., items, people associated with the items, and payment information) are then stored at 416.

Method 400 then generates order processing instructions and order delivery instructions at 418 and communicates the order processing instructions and order delivery instructions to a physical store that will deliver the order at 420. In some embodiments, the method may select a physical store that is closest to the delivery address provided for the order. In other embodiments, the people placing the order can select the physical store to deliver the items.

In some embodiments, an order is generated over a period of time, such as a few hours or a few days. When multiple people are placing items in the same order, they may not all be available to identify their desired items at the same time. Thus, the systems and methods described herein allow the multiple people to order their items at different times. For example, a first person may open the order, select their items, and provide their payment information. However, the order remains open for other people to add their items and their payment information. After the other people have selected their items and provided payment information, the last person can close (or finalize) the order. Once the order is closed, the systems and methods described herein handle the fulfillment and delivery of the order.

In some embodiments, the person who opens (or initiates) the order is considered the "primary" person for the order. The primary person selects their items and enters their payment information. Then, the primary person identifies other people (e.g., roommates or housemates) who can also add items to the order. The systems and methods described herein notify the other people that the order has been opened and provide an opportunity for the other people to add their own items and payment information to the order. Each time one of these people add items to the order, the primary person is notified of the additional items. After all other people have selected their items (or declined to add items to the order), the primary person can close the order. Alternatively, the systems and methods discussed herein may automatically close the order after all of the other people identified by the primary person have selected their items and provided payment information. In some implementations, the primary person may close (or finalize) the order before all of the other people have selected their items. For example, if at least one person has not selected items after two days, the primary person may close the order to avoid further delays in finalizing the order.

In some embodiments, an entity, group, department or organization may be associated with particular items in an order instead of an individual person. For example, an order containing multiple items may be associated with different departments (or work groups) within an organization, thereby allowing the fulfillment and delivery of a single order, but charging the cost of different items to different departments within the organization. In other embodiments, different entities in a common geographic location may be associated with items in a single order. For example, multiple businesses in the same mall or shopping center can place a common order, but each business identifies the items to be delivered to that business. And, each business can pay for their items separately of the other businesses.

Figure 5:
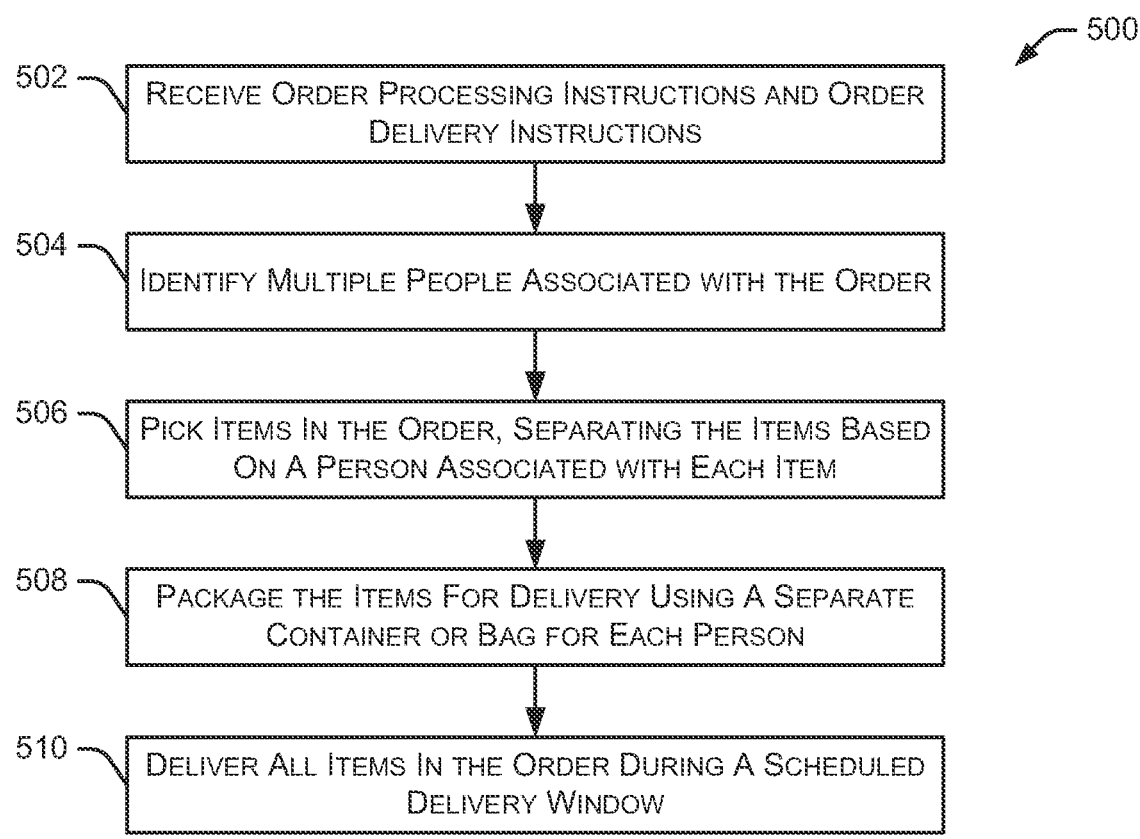
FIG. 5 is a flow diagram depicting an embodiment of a method for fulfilling and delivering an order containing multiple items for multiple people.

FIG. 5 is a flow diagram depicting an embodiment of a method 500 for fulfilling and delivering an order containing multiple items for multiple people. Initially, method 500 receives order processing instructions and order delivery instructions at 502. For example, the order processing instructions and order delivery instructions may be received by a physical store from order management system 114 in online marketplace 102. Method 500 identifies multiple people associated with the order at 504 and picks items in the order at 506. When picking the multiple items, those items are separated based on a person associated with each item. For example, the multiple items may be placed in different storage bins or different compartments of a bin based on the person associated with each item. After all items are picked, the items are packaged for delivery using a separate container or bag for each person at 508. All items in the order are then delivered at the scheduled delivery time in their separate containers or bags at 510. In some embodiments, one receipt is provided for the entire order and the receipt identifies the items associated with each person. In other embodiments, a separate receipt is provided for each person associated with at least one item in the order. In further embodiments, printed and/or electronic receipts may be provided to each of the people associated with the order.

In some embodiments, the separate container or bag for each person's items may include different color bags, different types of bags (plastic bags, paper bags, and fabric bags), cardboard boxes, plastic boxes, plastic totes, and the like. In other embodiments, a tag or other identifier is placed on a bag, box or other container to distinguish between the multiple people ordering items. For example, all bags may be the same color, but a different colored tag is added to each bag to identify different users, such as blue tags for John and red tags for Kate. In other embodiments, a tag with the person's name is attached to each bag to identify the items associated with that person.

Figure 6:
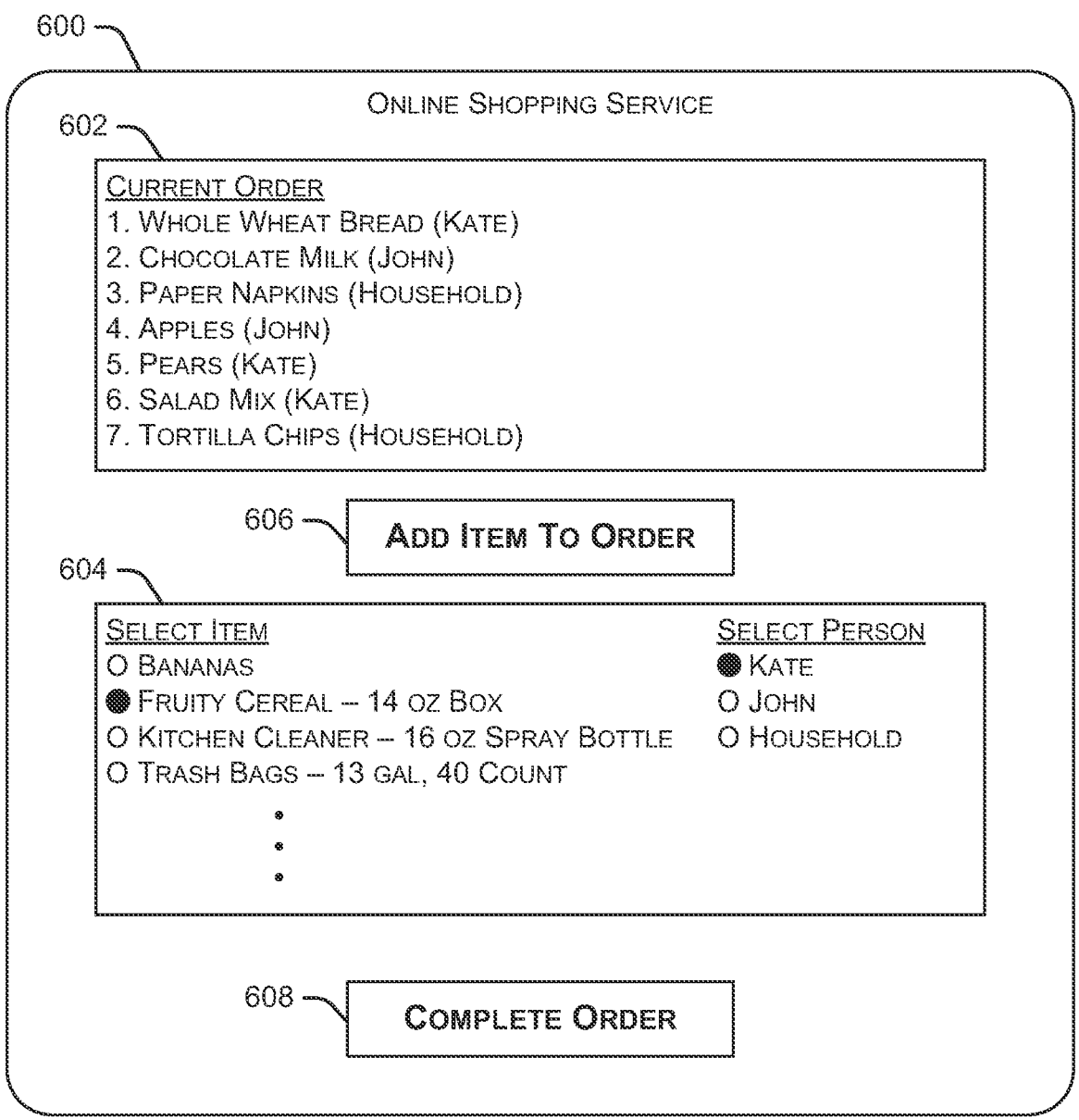
FIG. 6 is a screen diagram depicting an embodiment of a user interface for customers to place online orders containing multiple items and associate a person with each item.

FIG. 6 is a screen diagram depicting an embodiment of a user interface 600 for customers to place online orders containing multiple items and associate a person with each item. User interface 600 includes a listing of items 602 selected in the current order and the person associated with each item. For example, Kate has ordered whole wheat bread, pears and salad mix, while John has ordered chocolate milk and apples. Also, paper napkins and tortilla chips have been ordered by the "household." The household items include, for example, shared items that are used by all members of the household. The cost of these items may be paid using a different payment method (e.g., paid from a household budget account) or may be divided equally among all people ordering items.

To add another item to the order shown in FIG. 6, an item is selected in window 604 along with the person associated with the selected item. In this example, Kate has selected fruity cereal (14 oz. box). Clicking an "Add Item To Order" button 606 adds the fruity cereal to the order and associates Kate's name with that item. When the order is finished (i.e., the users do not want to add any more items to the order), a "Complete Order" button 608 is activated.

Figure 7:
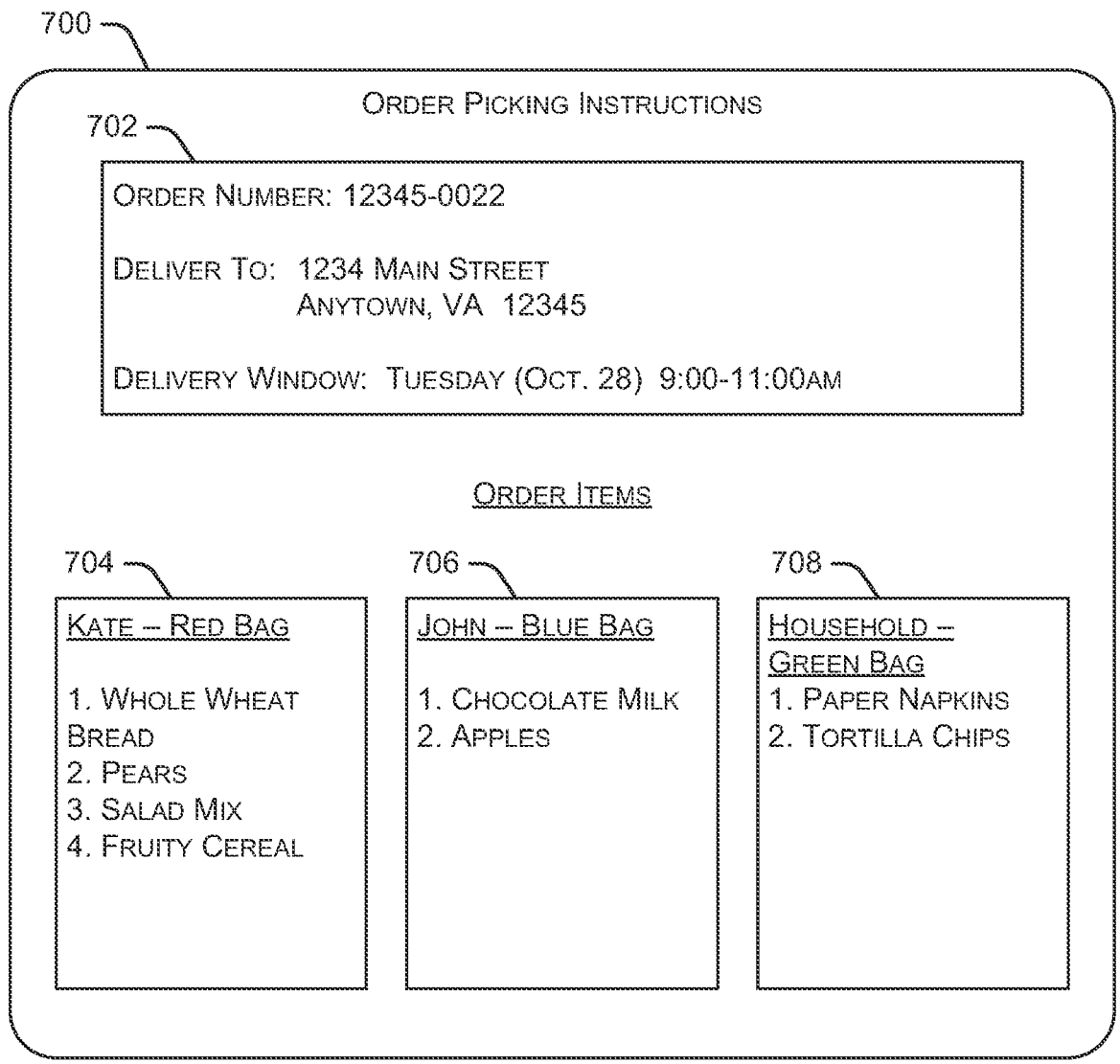
FIG. 7 is a screen diagram depicting an embodiment of a user interface for presenting order fulfillment and order delivery instructions.

FIG. 7 is a screen diagram depicting an embodiment of a user interface 700 for presenting order fulfillment and order delivery instructions. Various order information, such as order number, delivery address, and delivery time window are shown in display window 702. The order items are separated based on the person associated with the item. In this example Kate's items are shown in 704, John's items are shown in 706, and the Household's items are shown in 706. The lists of items ordered 704, 706, and 708 also indicate the manner in which each person's items should be packaged. In this example, Kate's items are packaged in one or more red bags, John's items are packaged in one or more blue bags, and the Household's items are packaged in one or more green bags.

Although the present disclosure is described in terms of certain specific embodiments, other embodiments will be apparent to those of ordinary skill in the art, given the benefit of this disclosure, including embodiments that do not provide all of the benefits and features set forth herein, which are also within the scope of this disclosure. It is to be understood that other embodiments may be utilized, without departing from the scope of the present disclosure.

What is claimed is:

1. A system comprising:
   one or more processors; and
   one or more non-transitory storage media storing computing instructions configured to run on the one or more processors and perform:
      receiving a single order containing items for a plurality of users, wherein each respective user of the plurality of users enters a respective order via a respective user interface of a respective mobile device at different times during a predetermined period of time while the single order remains open, wherein the respective user interface of the respective mobile device of each respective user of the plurality of users comprises a simultaneous display of a first window and a second window,
      wherein:
         the first window presents a single list of the items included in all respective orders of the plurality of users, wherein the single list includes a respective indication of each respective user associated with each of the items based on the respective order of each respective user;
         the second window presents (i) a list of additional items that are selectable within the second window for presentation within the first window and iii) upon receiving a selection from the second window of an additional item from the list of additional items in the second window, wherein the selection is made by a first user of the plurality of users participating in the single order; and
         after receiving the selection, the first window presents the additional item as part of the single list of the items;
      automatically closing the single order after the predetermined period of time expires;
      responsive to automatically closing the single order, identifying the single order comprising the items for the plurality of users for delivery to a common geographic location, wherein the single order further comprises instructions to separate each respective item of the items associated with each user of the plurality of users by:
         identifying each respective item of the items in the single order, wherein the single order is stored in a database of a retailer;
         identifying the plurality of users associated with the single order by accessing a respective user account for each user of the plurality of users, wherein the respective user accounts are stored in a user database;
         identifying each user of the plurality of users that is associated with each respective item of the items in the single order; and
         generating a respective list of items of the items associated with each user of the plurality of users;
      calculating respective payments for respective portions of the single order, wherein each user of the plurality of users is presented with a respective one of the respective lists of items and a respective cost for the respective one of the respective lists of items associated with the respective portions of the single order;
      receiving a respective payment of the respective payments associated with the respective portions of the single order from each user of the plurality of users, the respective payment being applied to the respective one of the respective lists of items; and
      generating order processing instructions to process the respective lists of items associated with the plurality of users after receiving the respective payments from the plurality of users.

2. The system of claim 1, wherein the computing instructions are further configured to perform:
   finalizing the single order when a predetermined period of time for payment has expired or when full payment for the single order has been received.

3. The system of claim 1, wherein the computing instructions are further configured to perform:
communicating the order processing instructions to a brick and mortar store that will deliver the single order.

4. The system of claim 1, wherein generating the order processing instructions include generating directions to put particular items in different containers based on a particular user of the plurality of users associated with the particular items.

5. The system of claim 4, wherein the different containers comprise bags having different colors.

6. The system of claim 4, wherein the different containers comprise containers manufactured from different materials.

7. The system of claim 4, wherein the order processing instructions further include directions to deliver to the particular user all of the different containers as a single delivery of the single order.

8. The system of claim 1, wherein the computing instructions are further configured to perform:
generating delivery instructions; and
communicating the delivery instructions to a brick and mortar store that will deliver the single order.

9. The system of claim 1, wherein the computing instructions are further configured to perform:
generating separate order receipts for each of the plurality of users, wherein the single order is an online order.

10. The system of claim 1, wherein the plurality of users associated with the single order live at the common geographic location and submit separate orders within the predetermined period of time before the single order automatically closes upon expiration of the predetermined period of time.

11. A method comprising:
receiving a single order containing items for a plurality of users, wherein each respective user of the plurality of users enters a respective order via a respective user interface of a respective mobile device at different times during a predetermined period of time while the single order remains open, wherein the respective user interface of the respective mobile device of each respective user of the plurality of users comprises a simultaneous display of a first window and a second window,
wherein:
the first window presents a single list of the items included in all respective orders of the plurality of users, wherein the single list includes a respective indication of each respective user associated with each of the items based on the respective order of each respective user;
the second window presents (i) a list of additional items that are selectable within the second window for presentation within the first window and (ii) upon receiving a selection from the second window of an additional item from the list of additional items in the second window, wherein the selection is made by a first user of the plurality of users participating in the single order; and
after receiving the selection, the first window presents the additional item as part of the single list of the items;
automatically closing the single order after the predetermined period of time expires;
responsive to automatically closing the single order, identifying, by a computer system, the single order comprising items for the plurality of users for delivery to a common geographic location, wherein the single order further comprises instructions to separate each respective item of the items associated with each user of the plurality of users by:
identifying, with the computer system, each respective item of the items in the single order, wherein the single order is stored in a database of a retailer;
identifying, with the computer system, the plurality of users associated with the single order by accessing a respective user account for each user of the plurality of users, wherein the respective user accounts are stored in a user database;
identifying, with the computer system, each user of the plurality of users that is associated with each respective item of the items in the single order; and
generating, with the computer system, a respective list of items associated with each user of the plurality of users;
calculating, with the computer system, respective payments for respective portions of the single order, each user of the plurality of users is presented with a respective one of the respective lists of items and a respective cost for the respective one of the respective lists of items associated with the respective portions of the single order;
receiving, with the computer system, the respective payments associated with the respective portions of the single order from each user of the plurality of users, the respective payment being applied to the respective one of the respective lists of items; and
generating, with the computer system, order processing instructions to process the respective lists of items associated with the plurality of users after receiving the respective payments from the plurality of users.

12. The method of claim 11, further comprising:
finalizing, with the computer system, the single order when:
a predetermined period of time for payment has expired or when full payment for the single order has been received.

13. The method of claim 11, further comprising:
communicating, with the computer system, the order processing instructions to a brick and mortar store that will deliver the single order.

14. The method of claim 11, wherein generating the order processing instructions include generating directions to put particular items in different containers based on a particular user of the plurality of users associated with the particular item.

15. The method of claim 14, wherein the different containers comprise bags having different colors.

16. The method of claim 14, wherein the different containers comprise containers manufactured from different materials.

17. The method of claim 14, wherein the order processing instructions further include directions to deliver to the particular user all of the different containers as a single delivery of the single order.

18. The method of claim 11, further comprising:
generating, with the computer system, delivery instructions; and
communicating, with the computer system, the delivery instructions to a brick and mortar store that will deliver the single order.

19. The method of claim 11, further comprising:
generating, with the computer system, separate order receipts for each of the plurality of users, wherein the single order is an online order.

20. The method of claim 11, wherein the plurality of users associated with the single order live at the common geographic location and submit separate orders within the predetermined period of time before the single order automatically closes upon expiration of the predetermined period of time.

* * * * *